Patented June 8, 1948

2,442,995

UNITED STATES PATENT OFFICE 2,442,995

PREPARATION OF DIFLUOROACETIC ACID

Donald D. Coffman, Wilmington, Del., assignor to E. I. du Pont de Nemours & Company, Wilmington, Del., a corporation of Delaware No Drawing. Application March 7, 1946, Serial No. 652,789

15 Claims. (Cl. 260—539)

This invention relates to a process for preparing fluorinated carboxylic acids and more particularly to the preparation of difluoroacetic acid.

The methods for preparing fluorine-containing carboxylic acids are relatively few and are somewhat limited in their application. Heretofore fluorine-containing carboxylic acids have been prepared by replacement of chlorine in chlorinated acids with fluorine by means of metallic fluorides. Certain fluorinated compounds, such as fluorochloroolefins and trifluoromethylbenzene, also have been oxidized to form fluorine-containing carboxylic acids.

An object of this invention is to provide a new and improved method for preparing fluorocarboxylic acids. A further object is to provide a new method for preparing difluoroacetic acid. Other objects will appear hereinafter.

These objects are accomplished by the hydrolysis of 2,4,6-tri(difluoromethyl)-s-triazine followed by the separation and isolation of the resulting difluoroacetic acid.

In the preferred procedure, a mixture of 2,4,6-tri(difluoromethyl)-s-triazine and water is heated in the presence of a catalyst, such as sodium hydroxide. After separation of any unreacted triazine, the acidified aqueous phase is filtered and then extracted with several portions of ether. The difluoroacetic acid is readily obtained by fractional distillation of the dried ether extract.

This invention is further illustrated by the following examples in which the amounts are expressed in parts by weight, unless otherwise specified.

*Example I*

A mixture of 50 parts of 2,4,6-tri(difluoromethyl)-s-triazine and 75 parts of water are heated under reflux for 50 hours. The water insoluble material is separated, washed with water, and distilled. In this manner 7 parts of unreacted triazine is recovered. A crystalline product (50 parts) is obtained from the aqueous phase when the water is removed by distillation. A portion of the solid (10 parts) in 20 parts of water is acidified with 8 parts of conc. sulfuric acid and then extracted ten times with methylene chloride (134 parts in all). Upon fractional distillation of the combined methylene chloride solutions, there is obtained one part of a liquid which is identified by boiling point and analysis as difluoroacetic acid.

*Example II*

A mixture of 22.2 parts of 2,4,6-tri(difluoromethyl)-s-triazine and 12 parts of sodium hydroxide dissolved in 70 parts of water is heated under reflux for 4 hours. Ammonia is evolved during the reaction. After separation of unreacted triazine, the aqueous phase is acidified by addition with cooling of 40 parts of 50% sulfuric acid, and then extracted with 17.5 parts of ether. Six parts of a liquid identified as difluoroacetic acid is obtained by fractional distillation of the dried ether extract.

Strong mineral acids are also catalysts for the hydrolysis of the fluorotriazine. For example, 4 parts of 2,4,6-tri(difluoromethyl)-s-triazine is completely hydrolyzed in 15 minutes when heated at 100° C. in the presence of an equal amount of aqueous 4N hydrochloric acid.

The 2,4,6-tri(difluoromethyl)-s-triazine used in this invention can be readily prepared in high yield from ammonia and tetrafluoroethylene as described in the copending application of George W. Rigby, Ser. No. 593,965, filed May 15, 1945.

Although the hydrolysis can be carried out in the presence of water alone, it is preferable to use a catalyst in order to shorten the reaction time. In addition to the catalysts used above other acids and bases such as phosphoric acid, p-toluenesulfonic acid, potassium hydroxide, calcium hydroxide and lithium hydroxide can be used. Strong mineral acids and alkali metal hydroxides are preferred. Because of its low cost and effectiveness sodium hydroxide is particularly preferred.

In general from 0.1 to 10 parts of catalyst per part of triazine gives good results. The amount of catalyst used will depend on the particular agent chosen as well as on the reaction conditions such as temperature. The water present in the hydrolysis mixture can also be varied within rather wide limits, for example from 0.1 to 10 or more times the amount of triazine present.

If the aqueous phase obtained after hydrolysis is not already acidic, any strong acid such as sulphuric, phosphoric, hydrochloric and p-toluenesulfonic acids can be used to make the water solution strongly acidic thereby liberating the free difluoroacetic acid from its salt before extraction with an organic solvent. Inert, water insoluble, neutral organic solvents such as ether, chloroform, and carbon tetrachloride are suitable extracting agents.

The hydrolysis can be conducted at a temperature ranging from 15° C. up to the decomposition temperature of the triazine. In general, a temperature range of 50–150° C. is preferred since particularly high yields are obtained under these conditions.

If desired, the hydrolysis can be carried out in the presence of an inert, water soluble solvent for the triazine, such as 1,4-dioxane or 1,2-di-(methoxy)ethane.

As many apparently widely different embodiments of this invention may be made without departing from the spirit and scope thereof, it is to be understood that I do not limit myself to the specific embodiments thereof except as defined in the appended claims.

I claim:

1. A method for preparing difluoroacetic acid which comprises hydrolyzing 2,4,6-tri(difluoromethyl)-s-triazine, in the presence of water, acidifying the reaction mixture, and separating difluoroacetic acid from the acidified reaction mixture.

2. A method for preparing difluoroacetic acid which comprises hydrolyzing 2,4,6-tri(difluoromethyl)-s-triazine in the presence of water and a catalyst, acidifying the reaction mixture, and separating difluoroacetic acid from the acidified reaction mixture.

3. A method for preparing difluoroacetic acid which comprises hydrolyzing 2,4,6-tri(difluoromethyl)-s-triazine in the presence of water and an acid catalyst, and separating difluoroacetic acid from the acid reaction mixture.

4. A method for preparing difluoroacetic acid which comprises hydrolyzing 2,4,6-tri(difluoromethyl)-s-triazine in the presence of water and a basic catalyst, acidifying the reaction mixture, and separating difluoroacetic acid from the acidified reaction mixture.

5. A method as set forth in claim 3 in which said acid catalyst is a strong mineral acid.

6. A method as set forth in claim 4 in which said basic catalyst is an alkali metal hydroxide.

7. A method as set forth in claim 4 in which said basic catalyst is sodium hydroxide.

8. A method for preparing difluoroacetic acid which comprises heating a mixture of 2,4,6-tri(difluoromethyl)-s-triazine and water until hydrolysis occurs, acidifying the reaction mixture, extracting difluoroacetic acid from the acidified reaction mixture and subsequently purifying the difluoroacetic acid.

9. A method for preparing difluoroacetic acid which comprises heating a mixture of 2,4,6-tri(difluoromethyl)-s-triazine and water in the presence of a basic catalyst until hydrolysis occurs, acidifying the reaction mixture, extracting difluoroacetic acid from the acidified reaction mixture and subsequently purifying the difluoroacetic acid.

10. A method as set forth in claim 9 in which said catalyst is an alkali metal hydroxide.

11. A method for preparing difluoroacetic acid which comprises heating a mixture of 2,4,6-tri(difluoromethyl)-s-triazine and water at a temperature of 50° to 150° C. until hydrolysis occurs, separating unreacted triazine from the reaction mixture, acidifying the reaction mixture, extracting difluoroacetic acid from the acidified reaction mixture with a solvent and subsequently purifying the difluoroacetic acid by fractional distillation from said solvent.

12. A method for preparing difluoroacetic acid which comprises heating a mixture of 2,4,6-tri(difluoromethyl)-s-triazine and water at a temperature of 50° to 150° C. in the presence of a basic catalyst until hydrolysis occurs, separating unreacted triazine from the reaction mixture, acidifying the reaction mixture, extracting difluoroacetic acid from said acidified reaction mixture with a solvent and subsequently purifying the difluoroacetic acid by fractional distillation from said solvent.

13. A method as set forth in claim 12 in which said basic catalyst is sodium hydroxide.

14. A method for the preparation of difluoroacetic acid which comprises heating a mixture of 2,4,6-tri(difluoromethyl)-s-triazine and water at a temperature of 50° to 150° C. until hydrolysis occurs, separating unreacted triazine from the reaction mixture, separating the hydrolysis product from the reaction mixture by crystallization, thereafter acidifying said hydrolysis product in aqueous solution, extracting difluoroacetic acid with a solvent from said acidified aqueous solution, and subsequently purifying the difluoroacetic acid by fractional distillation from said solvent.

15. A method for preparing difluoroacetic acid which comprises heating a mixture of 2,4,6-tri(difluoromethyl)-s-triazine and water in the presence of a catalyst until hydrolysis occurs, acidifying the reaction mixture, extracting difluoroacetic acid from the acidified reaction mixture and subsequently purifying the difluoroacetic acid.

DONALD D. COFFMAN.

REFERENCES CITED

The following references are of record in the file of this patent:

Weddige, Journal fur Praktische Chemie, N. F. Bd. 33, S. 76 (1886).